United States Patent [19]

Tsukamoto et al.

[11] Patent Number: 5,612,122
[45] Date of Patent: Mar. 18, 1997

[54] HIGH RECORDING DENSITY MAGNETIC RECORDING MEDIUM HAVING AN UNDERCOAT LAYER OF IRON OXIDE AND CARBON BLACK

[75] Inventors: Yoji Tsukamoto; Shigeto Oiri; Toshio Ohta, all of Kanagawa, Japan

[73] Assignee: Imation Corp., St. Paul, Minn.

[21] Appl. No.: 501,106

[22] PCT Filed: Feb. 7, 1994

[86] PCT No.: PCT/US94/01331

§ 371 Date: Aug. 8, 1995

§ 102(e) Date: Aug. 8, 1995

[87] PCT Pub. No.: WO94/18672

PCT Pub. Date: Aug. 18, 1994

[30] Foreign Application Priority Data

Feb. 8, 1993 [JP] Japan .................................. 5-020185

[51] Int. Cl.⁶ ....................................................... G11B 5/70
[52] U.S. Cl. ........................... 428/216; 428/323; 428/329; 428/336; 428/694 BS; 428/900
[58] Field of Search ................................. 428/216, 323, 428/329, 386, 694 BS, 900

[56] References Cited

U.S. PATENT DOCUMENTS

| | | | |
|---|---|---|---|
| 4,587,157 | 5/1986 | Brock et al. | 428/216 |
| 4,664,975 | 5/1987 | Kobayashi | 428/323 |
| 4,666,769 | 5/1987 | Miyata et al. | 428/323 |
| 4,680,742 | 7/1987 | Yamada et al. | 369/13 |
| 4,861,656 | 8/1989 | Uchiyama et al. | 428/333 |
| 4,963,433 | 10/1990 | Ogawa et al. | 428/323 |
| 4,975,322 | 12/1990 | Hideyama et al. | 428/323 |
| 5,256,481 | 10/1993 | Miyake et al. | 428/336 |
| 5,258,223 | 11/1993 | Inaba et al. | 428/323 |
| 5,268,206 | 12/1993 | Komatsu et al. | 427/548 |
| 5,354,610 | 10/1994 | Ozawa et al. | 428/323 |
| 5,358,777 | 10/1994 | Kojima et al. | 428/212 |
| 5,384,175 | 1/1995 | Kojima et al. | 428/64 |
| 5,405,679 | 4/1995 | Isobe | 428/212 |
| 5,447,782 | 9/1995 | Inaba et al. | 428/212 |

FOREIGN PATENT DOCUMENTS

| | | |
|---|---|---|
| 0488657A2 | 3/1992 | European Pat. Off. . |
| 0609154A1 | 8/1994 | European Pat. Off. . |
| 61-177631 | 8/1986 | Japan . |
| 61-214127 | 9/1986 | Japan . |
| 63-317926 | 12/1988 | Japan . |
| 63-317925 | 12/1988 | Japan . |
| 1-213822 | 8/1989 | Japan . |
| 1-300419 | 12/1989 | Japan . |
| 5-274645 | 10/1993 | Japan . |
| WO94/18673 | 8/1994 | WIPO . |

*Primary Examiner*—Stevan A. Resan
*Attorney, Agent, or Firm*—Eric D. Levinson

[57] ABSTRACT

A high recording density magnetic recording medium including a non-magnetic base film, a magnetic layer, and an undercoat layer provided therebetween. The undercoat layer includes non-magnetic particles, a binder resin, and a lubricant. The non-magnetic particles comprise (1) a non-magnetic iron oxide with an acicular ratio ranging from 5 to 10 and a long axis length ranging from 0.05 to 0.3 μm, and (2) a carbon black having a structure constitution, and the weight ratio between said non-magnetic iron oxide and said carbon black is within the range between 85/15 and 99/1.

8 Claims, No Drawings

HIGH RECORDING DENSITY MAGNETIC RECORDING MEDIUM HAVING AN UNDERCOAT LAYER OF IRON OXIDE AND CARBON BLACK

FIELD OF THE INVENTION

The present invention relates to a magnetic recording medium., e.g. a magnetic disk such as floppy disk, a magnetic tape such as video tape and data cartridge, and the like, and further to the composition of a magnetic recording medium having an undercoat layer provided between the magnetic layer and the base film of the medium.

BACKGROUND OF THE INVENTION

High recording density has become an indispensable requirement to the performance of magnetic recording media, thereby requiring a decrease in the thickness of the magnetic layer in the media. However, the decrease of the magnetic layer thickness (about 1 µm or less) has been accompanied by attendant practical problems; e.g., the durability of a magnetic layer becomes noticeably decreased at low thicknesses. Many techniques of providing an undercoat layer between a magnetic layer and a base film have been examined to improve the durability of such a magnetic layer.

Japanese Unexamined Patent Publication No. 1-213822 discloses that in a magnetic recording medium provided with an undercoat layer containing a non-magnetic iron oxide and a carbon black, electroconductivity and the surface smoothness of a magnetic layer becomes improved and in turn, the electromagnetic transfer characteristic or durability is improved. However, this reference makes no mention of an excellent effect attributable to the acicular shape of non-magnetic iron oxide particles.

In addition, Japanese Patent Application No. 1-300419 discloses that the electroconductivity of a recording medium, and the surface smoothness and electromagnetic transfer characteristic of the magnetic recording medium are improved by the use of acicular non-magnetic particles as an insulator for an undercoat layer containing a carbon black. Although the patent application includes a description to the effect that acicular non-magnetic iron oxide can be used as acicular non-magnetic particles, this acicular non-magnetic iron oxide is expected for its function as an insulator. Accordingly, the amount of the non-magnetic iron oxide used based on the amount of the carbon black is small (20 to 60% by volume ratio; about 40 to about 80% converted to weight ratio). However, when the proportion of the non-magnetic iron oxide is so low as mentioned above, there cannot be obtained such high surface smoothness as obtained by the present invention.

On the other hand, it is known that a carbon black having a structure constitution has high electroconductivity. Japanese Unexamined Patent Publication No. 61-177631 discloses a technique of controlling the electrostatic property of a magnetic layer by the utilization of a carbon black having a structured constitution. In this patent publication, the use of a carbon black with an oil absorbency of 90 (DBP) ml/100 g or more is recommended; however this oil absorbency is insufficient according to the present invention.

SUMMARY OF THE INVENTION

The object of the present invention is to provide a magnetic recording medium which improves both the smoothness and durability of a magnetic layer surface by providing an undercoat layer with a specific composition between a magnetic layer and a base film to create a medium having high density recording and high durability.

The aforesaid problems are solved by a high recording density magnetic recording medium provided with an undercoat layer between a non-magnetic base material and a magnetic layer. The undercoat layer is comprised of a binder resin, a lubricant, and non-magnetic particles. The non-magnetic particles are comprised of non-magnetic iron oxide with an acicular ratio ranging from 5 to 10 and long axis length ranging from 0.05 to 0.3 µm and a carbon black having a structure constitution, and the weight ratio between said non-magnetic iron oxide and said carbon black is within the range between 85/15 and 99/1.

DETAILED DESCRIPTION

The magnetic recording medium of the present invention has at least a non-magnetic base material, an undercoat layer, and a magnetic layer. The non-magnetic base material may be any material which is conventionally used as the base material of a magnetic recording medium, including organic or inorganic materials such as polyethylene terephthalate film, polyethylene naphthalate film, acetate film, polyimide film, polyamide film, glass, etc.

The non-magnetic particles contained in the undercoat layer are required to contain a non-magnetic iron oxide with an aspect ratio ranging from 5 to 10 and a long axis length ranging from 0.05 to 0.3 µm. In such a high recording density magnetic recording medium having a thin magnetic layer as in the present invention, the important functions required for the undercoat layer are as follows:

(1) To act as a lubricant reservoir in place of the thin magnetic layer for the realization of high durability of the recording medium;

(2) To improve the electroconductivity of the magnetic layer (that of lowering the surface resistivity); and (3) To improve the smoothness of the magnetic layer surface, while the aforesaid functions (1) and (2) are simultaneously realized.

In order to realize function (1), it is necessary to use non-magnetic particles with a high aspect ratio for the undercoat layer. Non-magnetic particles with a high aspect ratio, when used in the undercoat layer, enlarge the percentage of voids in the undercoat layer to a greater extent than do granular particles, and thereby noticeably improve the gathering function of a lubricant. The acicular ratio is required to be 5 or more, and when the ratio is less than 5, there may be obtained only the same effect as in the case where granular non-magnetic particles are used. However, when the aspect ratio is greater than 10, the non-magnetic particles become liable to be broken and destroyed because they cannot withstand the high shearing strength in the kneading dispersion treatment of the undercoating material. Such destroyed particles are likely to be adhered in the coating material which would noticeably impair the surface smoothness when applied as an undercoat layer.

In addition, in order to improve the surface smoothness of the undercoat layer, such acicular non-magnetic particles must be small. For this purpose, the non-magnetic particles must have a long axis length (the length of the longest portion of the shape of an acicular particle) of 0.3 µm. However, particles with a long axis length of less than 0.05 µm are liable to be adhered and cannot be dispersed when they are formed into a coating material.

The acicular non-magnetic particles are preferably non-magnetic iron oxide particles. Non-magnetic iron oxides are inexpensive, and may be easily available in desired shaped and size. In addition, since the particle surface of a non-magnetic iron oxide is very similar to the surface of a magnetic substance used in the magnetic layer, when the non-magnetic iron oxide particles are kneaded and dispersed for the preparation of a undercoating material, the materials and/or process techniques for the preparation of a hitherto known coating material for a magnetic layer can be utilized as such. Excellent dispersibility in a coating material and controllability of the particle shape and size are indispensable for the present invention.

For the realization of function (2), it is necessary to use an electroconductive carbon black mixed with an acicular non-magnetic iron oxide. However, the amount of the carbon black added to the non-magnetic iron oxide should not exceed 15% by weight to avoid impairing the surface smoothness of the undercoat layer is impaired.

In order to cause a recording medium to exhibit a high electroconductivity with a small amount of added carbon black, it is necessary to use a carbon black having a structured constitution with high electroconductivity. As used herein, the term "structured constitution" means a chain-like connection of the individual carbon black particles or cohesion structure thereof. Since such a carbon black has high electroconductivity, the surface resistivity of the magnetic layer or undercoat layer can be lowered by blending it with the layer in a small amount.

The oil absorbency of carbon black is a generally used criterion for the development grade of the structured constitution of the carbon black. In general, the greater the oil absorbency, the better developed the structure constitution and the greater the electroconductivity. It has been found that, when a small amount of carbon black is added into the undercoat layer, the effect of the carbon black cannot be sufficiently exhibited, unless a Carbon black with a far greater oil absorbency is used. The oil absorbency (dibutylphthalate-DBP) of the carbon black having a structure constitution usable with the present invention is preferably at least 300 ml/100 g, and more preferably 450 ml/100 g or more.

Preferred sources of carbon black having an oil absorbency of 300 ml/100 g include K.B. EC (produced by Lion K. K.), 360 ml/100 g; K.B. EC 600JD (produced by Lion K. K.), 495 ml/100 g; HS-500 (produced by Asahi Carbon K.K.), 447 ml/100 g; Black Pearls 2000 (produced by Cabot K. K.), 330 ml/100 g; and #3950 (produced by Mitsubishi Kasei Kogyo K.K.), 360 ml/100 g.

The binder may be any binder that is conventionally used in a magnetic recording medium, e.g., urethane resins, polyvinyl chloride resins, phenoxy resins, polyester resins or copolymers of a vinyl chloride monomer and other vinyl monomers.

The compounding ratio between the non-magnetic particles and the binder contained in the undercoat layer should be within the range between 70/30 and 85/15. When the amount proportion of the non-magnetic particles is less than the above range, the durability of the undercoat layer is lowered and the electroconductivity thereof decreases. In addition, the surface smoothness of the undercoat layer may be worsened, thereby lowering the electromagnetic transfer characteristic. When the amount of the non-magnetic particles exceeds the above range, however, the undercoat layer becomes inferior in the adhesion strength to the non-magnetic base material, which brings about practical problems.

As the lubricant contained in the undercoat layer of the magnetic recording medium of the present invention, there may be used ordinary lubricants, e.g., fatty acid esters, fatty acids, fatty acid amides, fluorine hydrocarbons, fluorine alcohols and the like. The amount of the lubricant is preferably within the range between 0.1 and 10 parts by weight per 100 parts by weight of the magnetic particles.

When the amount of the lubricant is less than 0.1 parts per 100 by weight, its lubricating properties are not effective, and durability and the like of the recording medium is not improved. When this amount exceeds 10 parts per 100 by weight, however, there is not obtained a suitable strength of the magnetic layer, the durability of the magnetic medium may be degraded.

The thickness of the undercoat layer should be within the range between 0.2 and 5 μm. When the thickness of the undercoat layer is less than 0.2 μm, calendering treatment of the magnetic layer cannot be sufficiently performed, and the surface smoothness of the magnetic layer is lowered. In the case of a magnetic layer with a thickness of 0.5 μm or less, the magnetic layer itself is unlikely to be formed when subjected to a calendering treatment, and the surface smoothing effect is noticeably lowered. However, when the thickness of the undercoat layer is sufficiently increased and the kind of the non-magnetic particles of the undercoat layer and the amount of the binder are most suitably selected, the undercoat layer is sufficiently deformed in place of the magnetic layer when effecting a calendering treatment, and the calendering treatment of the magnetic layer can be sufficiently performed.

When the thickness of the undercoat layer is larger than 5 μm, however, another problem arises. If the undercoat layer is too thick, it becomes difficult to apply a magnetic layer onto the undercoat layer, and it becomes impossible to obtain a sufficient surface smoothness of the undercoat layer, resulting in lowering of the electromagnetic transfer characteristic thereof. The reason for this is believed to be that when the undercoat layer is too thick as compared with the magnetic layer, the solvent in the magnetic layer is transferred into the undercoat layer to an excessive extent.

In addition, considering also the function of the undercoat layer as a lubricant reservoir, it is preferable to set the thickness of the undercoat layer within the aforesaid range. When the undercoat layer is too thick, it becomes difficult to supply the lubricant stored in the undercoat layer to the magnetic layer, and when the undercoat is too thin, a sufficient amount of lubricant cannot be stored therein, and the durability of the undercoat layer is lowered. These problems have become conspicuous especially in a high density recording magnetic recording medium having a magnetic layer and undercoat layer with a thickness of 0.5 μm or less.

The magnetic powder particles in the magnetic layer of the magnetic recording medium of the present invention may be conventionally used magnetic particles such as needle iron oxide type magnetic substance ($\gamma$-$Fe_2O_3$, $Fe_3O_4$ and the like), Co-containing needle iron oxide type magnetic substance, metallic ferromagnetic substance (metallic magnetic substance), hexagonal system magnetic substance (barium ferrite and the like), iron carbide type magnetic substance and the like.

The thickness of the magnetic layer is most favorably set according to the recording density or recording system. The present invention is suitable for a magnetic recording medium in which a magnetic layer thickness of 0.5 μm or less is required, especially a digital system magnetic recording medium having a recording capacity of 20 MB or more. Furthermore, by the present invention, there is provided a magnetic recording medium excellent in durability, electroconductivity and electromagnetic transfer characteristic, although the recording medium has such a thin magnetic layer.

The process for the preparation of the magnetic recording medium of the present invention is as follows.

A coating material for the undercoat layer is prepared by kneading and dispersing a non-magnetic iron oxide and carbon black used in the present invention together with a binder, lubricant, solvent and the like. When preparing the coating material, the above materials are all poured into an equipment for kneading and dispersion, simultaneously or in some installments. For example, a carbon black is first poured into a solvent containing a binder to effect kneading, and thereafter, the non-magnetic iron oxide is poured into the thus obtained kneaded mixture and then the kneading is continued, whereafter the newly obtained kneaded mixture is transferred to a dispersing device so as to complete the dispersion. Subsequently, a lubricant is added to the thus obtained dispersant to prepare a coating material for undercoat layer. Other similar methods may be used.

The kneading and dispersion of the materials for the preparation of a coating material for undercoat layer may be accomplished by known methods, such as by the use of a kneader, planetary mixer, extruder, homogenizer, high speed mixer or the like. Examples of a dispersing device are sand mill, ball mill, atomizer, tornado disperser, high speed impact mill and the like.

Various known additives for the magnetic layer or back coat layer may be added into the coating material for the undercoat layer if necessary, such as various kinds of hardeners, fungicidal agents, surface active agents and the like.

The coating material may be applied to the base material by an air doctor coater, blade coater, air knife coater, squeeze coater, reverse roll coater, gravure coater, kiss coater, spray coater, or die coater. The coating material for the top coat layer is prepared by kneading and dispersing various magnetic substances together with a binder, lubricant, antifriction material, solvent and the like, and the thus prepared coating material for the top coat layer is applied onto an undercoat layer.

For the kneading dispersion treatment of the coating material for the top coat layer, its application and various additives, known techniques may be used for the aforesaid coating material for undercoat layer.

The application of the top coat layer may be performed by applying the undercoating material to the base material followed by drying thereof to form an undercoat layer and thereafter, applying the top coat layer, or by applying the top coat layer before the undercoat layer is dried, or by simultaneously applying the undercoat layer and the top coat layer and thereafter drying these layers.

Although the drying temperature for the undercoat layer and top coat layer varies depending upon the type of solvent or base material, the drying of these layers is performed preferably at a temperature ranging from 40° to 120° C. under a drying air flow rate ranging from 1 to 5 kl/m$^2$, for a drying time ranging from 30 seconds to 10 minutes. In addition, the drying may be accomplished by irradiation with infrared rays, far infrared rays or electronic beam.

Before the top coat layer is dried, the magnetic particles may be orientated or disorientated, if necessary. The orientation of the magnetic particles is performed by subjecting the magnetic particles to a magnetic field in a longitudinal, vertical or an oblique direction (e.g., diagonally to the base material plane by an angle of 45 degrees, etc.) by a permanent magnet or an electromagnet, and drying the magnetic particles outside or inside the magnetic field. The disorientation of the magnetic particles is performed by randomly setting the direction of the magnetic particles in a horizontal plane or in a three-dimensional space by an alternating current magnetic field, rotating magnetic field or the like. In order to perform this orientation or disorientation, known methods may be used.

The thus dried undercoat layer and top coat layer may be subjected to calendering treatment, if necessary. A calendering treatment is performed by a known method using a metal plated roll, flexible roll or the like. Although the treating conditions vary depending on the kinds of the materials (binder, base material or the like) used in the undercoat layer and top coat layer, this treatment is preferably performed at a heating temperature ranging from 30° to 90° C., and under a pressurizing strength ranging from 500 to 4000 pounds per lineal inch (pli).

In addition, as various materials except for the non-magnetic iron oxide and carbon black specified in the present invention, there may be used known ones, and it suffices if some of the materials are selected and combined as occasion demands.

The present invention will now be further illustrated by the following non-limiting Example.

EXAMPLE (1) Production process for a coating material for undercoat layer:

The raw materials set forth in Table 1 were subjected to kneading dispersion treatment in the way mentioned below so that a coating material for primer coating was prepared. All of the carbon black was poured into a solution obtained by dissolving all of the urethane resin and all of the vinyl resin in all of the solvent, whereafter these substances were kneaded for about 10 minutes by a high speed mixer. Furthermore, all of the non-magnetic iron oxide was poured into the thus kneaded mixture, and they were again kneaded for about 50 minutes by a high speed mixer to obtain a kneaded mixture. The thus obtained kneaded mixture was then transferred into a sand mill so as to be subjected to a dispersion treatment for 20 hours, so that a disperse substance was obtained. Into the thus obtained disperse substance were poured all of the oleic acid, the isocetyl stearate, and the polyisocyanate, and these were stirred for about 30 minutes by a high speed mixer, so that a final coating material for primer coating was obtained.

TABLE 1

| Undercoat Layer | | |
| --- | --- | --- |
| Total amount of the non-magnetic substance and carbon black (see Table 3) | | 103 (parts by weight) |
| Urethane resin | "TM-1" produced by Toyo Boseki K.K.: molecular weight [Mw]: about 40,000 | 9.0 |
| Vinyl resin | "MR-120" produced by Nippon Zeion K.K. molecular weight [Mw]: about 30,000 | 9.0 |
| Oleic acid | "Lunac-OA" produced by Kao K.K. | 1.0 |
| Isocetyl steartate | "ICS-R" produced by Higher Alcohol Co., Ltd. | 2.0 |
| Polyisocyanate | "SBU-0856" produced by Sumitomo Bayer Urethane Co., Ltd. | 6.0 |
| Methyl ethyl ketone | | 150 |
| Cyclohexanone | | 45 |
| Toluene | | 45 |

(2) Production process for a coating material for the top coat:

The raw materials set forth in Table 2 were subjected to kneading dispersion treatment in the way as mentioned below, so that a coating material for the top coat was prepared. In a solution obtained by dissolving all of the urethane resin in all of the solvent, the metallic magnetic substance was poured little by little, while the solution was stirred by a high speed mixer. After the stirring had been continued for about 30 minutes from the time when the whole amount of the metallic magnetic substance was poured, all of dispersants 1 and 2 were poured into the solution. About 10 minutes later, all of the vinyl resin was poured into the solution and the stirring was continued. Several minutes later, all of the alumina was poured into the solution and the solution stirred for about 10 minutes, so that a kneaded mixture was obtained. The thus obtained kneaded mixture was then transferred into a sand mill and subjected to dispersing treatment for 30 hours, so that a disperse substance was obtained. Into the thus obtained disperse substance were poured all of the oleic acid, the isocetyl stearate, and the polyisocyanate, and the substances were stirred for about 30 minutes by a high speed mixer, so that a final coating material for the top coat was obtained.

TABLE 2

| | Magnetic Layer | |
|---|---|---|
| Metallic magnetic substance | ("HM-36" produced by Dowa Mining Co., Ltd: BET value = 49 m²/g) | 100 (parts by weight) |
| Alumina | ("HIT-50" produced by Sumitomo Kagaku K.K.: BET value = 8.4 m²/g) | 8 |
| Dispersant 1 | (phosphated polyoxyalkyl polyol disclosed in Japanese Unexamined Patent Publication No. 63-14326) | 4 |
| Dispersant 2 | (N,N-dialkyl-N-hydroxyalkyl-polyoxyalkuylene ammonium salt disclosed in U.S. Pat. No. 3,123,641) | 2 |
| Urethane resin | ("TI-7310" produced by Sanyo Kasei K.K.: molecular weight [Mw]: about 33,000) | 4 |
| Vinyl resin | ("VAGH" produced by Union Carbide Co., Ltd.: presumed average polymerization degree = 500) | 6 |
| Oleic Acid | ("Lunac O-A" produced by Kao K.K.) | 3 |
| Isocetyl Stearate | ("ICS-R" produced by Higher Alcohol Co., Ltd.) | 2 |
| Polyisocyanate | ("SBU-0856" produced by Sumitomo Bayer Urethane Co., Ltd.) | 7 |
| Methyl ethyl ketone | | 120 |
| Cyclohexanone | | 40 |
| Toluene | | 40 |

(3) Application process:

The aforesaid coating material for the undercoat layer was applied onto a base film ("AXP-54"/62 μm thickness produced by Teijin K. K.) by a gravure coater, and dried for 40 seconds at a temperature of 40° C., and then for 30 minutes at a temperature of 100° C. After the drying had been completed, the base film was subjected to a calendering treatment by the use of metal plated rolls. This treatment was performed at a heating temperature of 45° C. and under a pressure of 1500 pli. The thickness of the undercoat layer after the calendering treatment had been completed was 2.0 μm. After the undercoat layer had been sufficiently hardened, the aforesaid coating material for top coat was applied onto the undercoat layer by a gravure coater, and dried for 30 seconds at a temperature of 40° C., and then, for 30 seconds at a temperature of 80° C. After the drying had been completed, the base film was subjected to a calendering treatment by the use of metal plated rolls. This calendering treatment was performed at a heating temperature of 45° C. under a pressurizing strength of 1500 pli, and the sum thickness of the top coat layer and the undercoat layer after the calendering treatment had been completed was 2.5 μm. The following samples were prepared as listed in Table 3.

TABLE 3

| | Non-Magnetic Compound | Carbon Black |
|---|---|---|
| Sample 1 | Produced by Toda Kogyo K.K.; acicular ratio = 7.7 "DNS-235" (α-Fe₂O₃) average particle long axis length = 0.25 μm 100 parts by weight | Produced by Lion K.K. "K.B.EC 600JD" oil absorbency = 495 ml/100 g 3 parts by weight |
| Sample 2 | Produced by Toda Kogyo K.K.; acicular ratio = 5.8 "DNS-250" (α-Fe₂O₃) average particle long axis length = 0.1 μm 100 parts by weight | Produced by Lion K.K. "K.B.EC 600JD" oil absorbency = 495 ml/100 g 3 parts by weight |
| Comparative Sample 1 | α-Fe₂O₃ acicular ratio = 7.1 average particle length = 0.5 μm 100 parts by weight | Produced by Lion K.K. "K.B.EC 600JD" oil absorbency = 495 ml/100 g 3 parts by weight |
| Comparative Sample 2 | Produced by Toda K.K.; granular; "100ED" (α-Fe₂O₃) average particle length = 0.1 μm 100 parts by weight | Produced by Lion K.K. "K.B.EC 600JD" oil absorbency = 495 ml/100 g 3 parts by weight |
| Comparative Sample 3 | Produced by Bayer AG; acicular ratio = 4 "Bayferrox 3910" (α-Fe₂O₃) average particle long axis length = 0.4 μm 100 parts by weight | Produced by Lion K.K. "K.B.EC 600JD" oil absorbency = 495 ml/100 g 3 parts by weight |
| Comparative Sample 4 | Produced by Toda Kogyo K.K.; acicular ratio = 7.7 "DNS-235"(α-Fe₂O₃) average particle long axis length = 0.25 μm 82 parts by weight | Produced by Lion K.K. "K.B.EC 600JD" oil absorbency = 495 ml/100 g 21 parts by weight |
| Comparative Sample 5 | Produced by Toda Kogyo K.K.; acicular ratio = 7.7 "DNS-235"(α-Fe₂O₃) average particle long axis length = 0.25 μm 100 parts by weight | Produced by Cabot K.K.; "VULCAN XC-720" oil absorbency = 185 ml/100 g 3 parts by weight |

The results obtained for the samples listed in Table 3 are set forth in Table 4 below.

TABLE 4

| | Ra [nm] | Running durability [10000 passes] | Signal output [dB] | Surface resistivity (Ω/□) |
|---|---|---|---|---|
| Sample 1 | 5.6 | 2000 or more | +0.7 | $6 \times 10^8$ |
| Sample 2 | 4.7 | 2000 or more | +0.8 | $5 \times 10^8$ |
| Comparative Sample 1 | 14.4 | 2000 or more | −0.4 | $8 \times 10^8$ |
| Comparative Sample 2 | 10.0 | 500 | ±0 | $7 \times 10^8$ |
| Comparative Sample 3 | 9.9 | 700 | ±0 | $5 \times 10^9$ |
| Comparative Sample 4 | 21.3 | 700 | −1.8 | $2 \times 10^4$ |

TABLE 4-continued

|  | Ra [nm] | Running durability [10000 passes] | Signal output [dB] | Surface resistivity (Ω/□) |
|---|---|---|---|---|
| Comparative Sample 5 | 4.8 | 600 | +0.7 | $3 \times 10^{11}$ |

*Ra: center line average height of the magnetic layer surface measured by a three-dimensional roughness measuring machine [TOPO-30] produced by WYYO Co., Ltd.
*Running durability: The magnetic recording medium was caused to run while the head of a floppy disk drive was left contacted with the medium, and the running durability was represented by the number of passes of the recording medium before a scratch was formed on the visually observed magnetic layer surface.
*Signal output: A frequency signal at a frequency of 600 kHz was recorded by the use of a 10 MB drive (FD 1331) produced by NEC, and its regenerative output was determined.
*Surface resistivity: The surface resistivity of the magnetic layer surface was determined by a high resistance resistivity meter "Hiresta IP" produced by Mitsubishi Yuka K.K. When the surface resistivity of a magnetic layer is outside the range between $10^6$ and $10^8$, this magnetic layer is an off-specification material.

The floppy disks obtained in Samples 1 and 2 have high durability owing to sufficient supply of lubricant as compared with the floppy disks in Comparative Samples 1 to 5, and exhibit high smoothness and high output. It may be seen from these results that the magnetic recording medium obtained by the present invention is excellent in durability and electromagnetic transfer characteristic.

What is claimed is:

1. A magnetic recording medium comprising:
    a non-magnetic base film;
    a magnetic layer; and
    an undercoat layer comprised of non-magnetic particles, a binder resin, and a lubricant, wherein the undercoat layer is provided between the base film and magnetic layer, and wherein the non-magnetic particles comprise (1) a non-magnetic iron oxide with an aspect ratio ranging from 5 to 10 and a long axis length ranging from 0.05 to 0.3 μm, and (2) a carbon black having a structured constitution and an oil absorbency of at least 300 (DBP) ml/100 g, wherein the weight ratio between the non-magnetic iron oxide and the carbon black is within the range between 85/15 and 99/1.

2. The medium of claim 1, wherein the carbon black has an oil absorbency of at least 450 (DBP) ml/100 g.

3. The medium of claim 1, wherein the weight ratio between the non-magnetic particles and the binder resin is within the range between 85/15 and 70/30.

4. The medium of claim 1, wherein the undercoat layer further comprises a hardening agent, and the weight ratio between the non-magnetic particles contained in the undercoat layer and a component consisting of the binder and the hardening agent is within the range between 85/15 and 70/30.

5. The medium of claim 1, wherein the thickness of the undercoat layer is within the range between 0.2 and 5 μm.

6. The medium of claim 1, wherein the thickness of the magnetic layer is 0.5 μm or less.

7. The medium of claim 3, wherein the thickness of the magnetic layer is 0.5 μm or less.

8. The medium of claim 4, wherein the thickness of the magnetic layer is 0.5 μm or less.

* * * * *